Figures 1, 2:
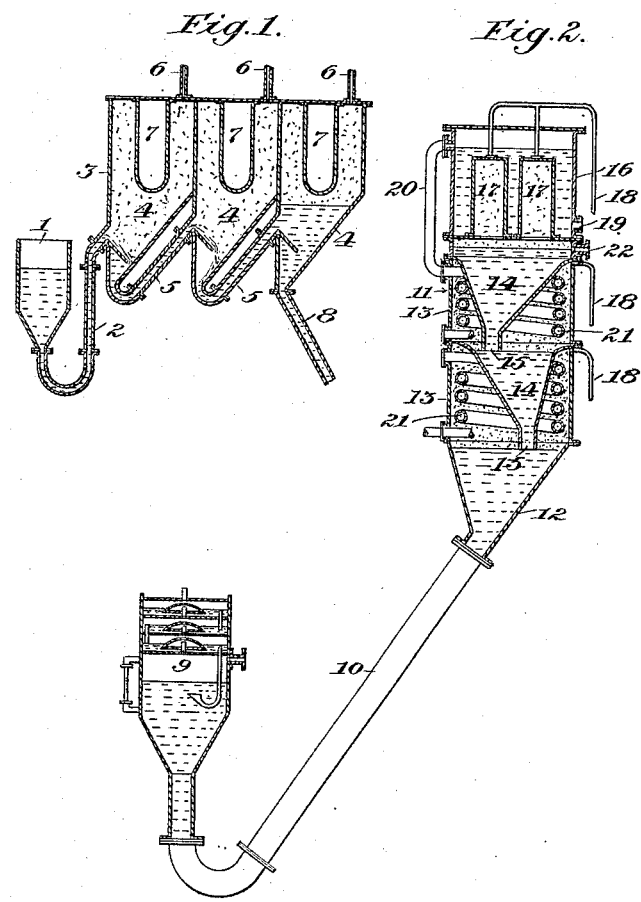

H. M. LIESE.
METHOD OF RECOVERING THE HEAT FROM HOT SOLUTIONS.
APPLICATION FILED JUNE 4, 1913.

1,184,360.

Patented May 23, 1916.

Witnesses:
Joseph W. Harris
N. P. Leonard

Inventor:
Hendrick M. Liese
by Byrnes Townsend & Brickenstein,
Att'ys.

UNITED STATES PATENT OFFICE.

HENDRIK M. LIESE, OF HAMBURG, GERMANY.

METHOD OF RECOVERING THE HEAT FROM HOT SOLUTIONS.

1,184,360.  Specification of Letters Patent.  Patented May 23, 1916.

Original application filed January 23, 1911, Serial No. 604,151. Divided and this application filed June 4, 1913. Serial No. 771,747.

*To all whom it may concern:*

Be it known that I, HENDRIK M. LIESE, a citizen of the German Empire, residing at Hamburg, Germany, have invented certain new and useful Improvements in Methods of Recovering the Heat from Hot Solutions, of which the following is a specification.

This application is a division of my application, Serial No. 604,151, filed January 23, 1911, and relates to a method of recovering the heat from hot solutions.

The recovery of the heat carried off in industrial waste water by means of heat exchange was hitherto carried out in such a manner, that the heat-transmitting surfaces were wetted directly by the heat-transferring waste water, all cavities being avoided as far as possible. This method is practical only as long as the waste water is clear and may be cooled without producing a precipitate. If, however, as is generally the case with industrial waste water, the waste water contains solid substances in suspension, or if its cooling will produce a precipitate, the heat-transmitting surfaces will soon become incrusted with these substances and lose considerably in their heat-conductive power. In addition to the losses in heat caused thereby, there result stoppages in the service caused by the necessity of frequent cleaning of the heat transmitting surfaces, which cleaning consumes both time and labor. With the object of avoiding this drawback, the heat of the waste water is, according to the present invention, conveyed to the heat-transmitting surfaces by means of steam, which is generated from the waste water by a reduction of the pressure.

It is not new to generate steam from hot waste water by reducing the pressure. Hitherto this was employed to utilize the steam as driving medium in a turbine. This previously-employed method, however, allows of the recovering only a small part of the heat contained in the waste water, whereas the present new method of employing the steam for transferring the heat of waste water to the heat-exchanging surfaces without any incrustation being formed on the latter admits of very extensive utilization of the waste water heat in a very advantageous manner. By the result of a very extensive recovery of the waste heat by exchange without any stoppages or losses, which were hitherto connected with such heat exchange, a considerable improvement is obtained from an engineering point of view.

The process for instance can be used for utilizing the heat, which is contained in the gas water of the ammonia distillation, such water containing lime. This gas water comes from the distilling apparatuses in a hot state and is to serve for preheating fresh gas water coming from the gas plants, before this gas water is introduced into the distilling apparatus. If the hot waste water coming from the distilling apparatuses should be brought into direct contact with the heat transmitting surfaces, which are to preheat the fresh gas water, such surfaces would be incrustated with the suspended particles in the waste water within a short time, and the further heat transmission would be interfered with. Therefore according to the present invention the heat contained in the waste water is not utilized by direct contact with the heat transmitting surfaces, but in the shape of steam developed under vacuum. The vacuum is necessary in order to effect the development of steam at all.

The heat from the waste liquors in the ammonia-soda process can also be utilized in the manner above outlined for the lime-containing waters above referred to. The waste water coming from the distilling apparatuses of this latter process can likewise be utilized for preheating the ammonia containing liquid to be distilled.

The accompanying drawing illustrates diagrammatically two methods of carrying out my invention.

In Figure 1, the hot waste water is contained in a conical container 1, communicating by means of a U-shaped pipe 2 rising from its lowest point, with the heat exchange apparatus 3. The latter is composed of a plurality, say three, adjoining evaporating and exchanging chambers 4, in such a manner that the lowest point of the preceding chamber communicates by a pipe 5 with a higher section of the following chamber. Each chamber communicates at its top by means of a pipe 6 with the apparatus for producing a vacuum. In each chamber the heat-exchanging surfaces 7 are arranged in the space above the inlet of the pipes 2, 5, 5, admitting the liquid. From the last chamber the water escapes through a pipe 8, leaving this pipe at its lowest point.

During the operation, the liquid will follow the vacuum and pass from one chamber into the other. In each chamber a part of the liquid will be evaporated and the steam thus generated will fill the upper part of the chamber, where it will come into heat-exchanging contact with the walls 7. From the last chamber the liquid may be drawn off through pipe 8 according to requirement, either by gravity or by pumps. The U-shaped pipe and the pipes 5 serve as water seals and the pressures in the various chambers differ by the height of the water columns of the pipes.

Under the influence of the reduction of the pressure a comparatively great generation of steam is obtained within the pipes 2, 5, 5, and the water column in the pipe is divided by intermediate bubbles of steam, so that the water will travel in intermittent gushes from chamber to chamber, whereby the water is constantly agitated and consequently preventing a deposit of suspended matter or precipitates. This intermittent motion of the water is further assisted by the inevitable disproportion between the pressure in the several chambers and the exchange of heat. The pressure depends on the temperature of the water; the efficiency of the several chambers depends on the difference between the temperature of the steam and the liquid, vaporous, or gaseous substances to be heated. Every non-uniformity will cause fluctuations, whereby the pressures and the movement of the fluid will be correspondingly affected. Such intermittent and fluctuating movement of the waste water admits of making the chambers in the form of continuously working autoclaves with conical shaped bottoms and to empty them at their lowest point. Contrary to the method hitherto employed for preventing deposits consisting in stirring up the water by means of the steam, the latter is here allowed to remain in the autoclave and it is prevented from being carried along with the water.

In Fig. 2, 9 is a vessel having a conical bottom which communicates by means of a U-shaped vertical pipe 10 with the heating or heat-exchanging apparatus fitted at a higher level. This apparatus has a conical bottom 12 with an eccentric opening and consists of a plurality of superimposed evaporating chambers arranged in form of a column, so that each of the chambers consists of an upper cylindrical portion 13 and a conical bottom 14, the latter projecting into the cylindrical part of the lower chamber and ends in a short open tube 15, which dips into the conical bottom of this chamber. The short tubes are eccentrically arranged in such a manner that the tube of the lower chamber alternates with the tube of the upper chamber. The top chamber is closed with a lid, on which is fitted a vessel 16 closed at the top, and having therein chambers 17, 17 communicating with the evaporating chamber. The chambers 13, 13 and 17 communicate by means of pipes 18 with the apparatus for producing a vacuum. The container 16 receives the fluid to be heated from below through a pipe 19. At the top it communicates by a pipe 20 with a coiled pipe 21, which traverses the chambers 13 and emerges from the bottom chamber at its warmest point. From the top chamber the cooled fluid passes off through a pipe 22 opening above the conical bottom.

After a vacuum has been established, the waste water rises with an intermittent motion, bubbles of steam being continuously liberated therefrom through the U-shaped pipe 10 and the chambers; the vapors collect in the chambers 13, in which the coiled pipe produces the exchange of heat and at the upper end of the column in the chambers 17, through the walls of which the heat is exchanged. It is not absolutely necessary to connect a suction pipe to each chamber, as the fluid will itself act as a pump.

The heat exchanging surfaces 7 are shown in Fig. 1 as extending into the upper or steam portion of the chambers 4, and in Fig. 2 as chambers 17, 17 and pipes 21, 21. Obviously the walls of these pipes or chambers may also be considered as the walls of the steam chamber, and the term "heat exchanging walls" as used in the claims is intended to apply to all these forms of devices, as well as to other forms of devices in which any medium is heated by exchange of heat with the steam through a conducting wall.

I claim:—

1. The method of recovering the heat of heated solutions containing incrusting matter comprising circulating said solutions by means of reduced pressure through successive chambers, developing steam in each chamber by means of the same vacuum by which the solution has been introduced into the said chamber and bringing the steam within the chamber in which it has been developed in contact with heat exchanging surfaces.

2. The method of recovering the heat of heated solutions containing incrusting matter comprising circulating said solutions through a plurality of intercommunicating chambers maintaining in each successive chamber a vacuum of a greater degree than in the preceding chamber, whereby steam is developed in and fresh solution sucked into each chamber from the preceding chamber and bringing the said steam into heat exchanging contact with heat exchanging surfaces within the said chambers.

3. The method of recovering the heat of heated solutions containing incrusting matter, comprising successively subjecting a flowing stream of said liquid to reduced pressure in successive chambers, thereby causing ebullition in said solution with the generation of steam and maintaining in suspension separated incrusting matter, and bringing said steam in contact with heat-exchanging surfaces.

4. The method of recovering the heat of heated solutions containing incrusting matter, comprising subjecting a flowing stream of said heated solution to reductions in pressure in separate chambers, thereby causing ebullition in said solution with the generation of steam and maintaining in suspension separated incrusting matter, then bringing the steam in contact with a heat-exchanging surface, and finally removing the solution and suspended incrusting matter from the last of said chambers.

5. The method of recovering the heat of hot solutions containing incrusting matter comprising introducing the hot solution into a chamber the outer walls of which are exposed to a lower temperature than that of the solution, subjecting the hot solution within said chamber to the action of a vacuum sufficient to produce a vapor atmosphere from said hot solution, bringing said vapor atmosphere into contact with one side of heat exchanging surface, and the other side of said heat exchanging surface into contact with a heat absorbing liquid.

6. The method of recovering the heat of hot solutions containing incrusting matter comprising introducing the hot solution into a chamber the outer walls of which are exposed to a lower temperature than that of the solution, subjecting the hot solution within said chamber to the action of a vacuum sufficient to produce a vapor atmosphere from said hot solution, bringing said vapor atmosphere into contact with one side of heat exchanging surface, and the other side of said heat exchanging surface into contact with a heat absorbing liquid different from the heat yielding solution.

In testimony whereof I affix my signature in presence of two witnesses.

HENDRIK M. LIESE.

Witnesses:
ERNEST H. L. MUMMENHOFF,
IDA CHRIST. HAFERMANN.

Copies of this patent may be obtained for five cents each, by addressing the "Commissioner of Patents, Washington, D. C."